United States Patent Office 2,857,418
Patented Oct. 21, 1958

---

2,857,418

POLYALKYLENEOXIDE ESTERS OF ALKOXY AMINOBENZOATES

Max Matter, Worb, and Albert Kobler, Max Kuhn, and Karl Michel, Guemligen, Switzerland, assignors to Ciba Pharmaceutical Products Inc., Summit, N. J.

No Drawing. Application August 28, 1956
Serial No. 606,543

Claims priority, application Switzerland August 30, 1955

10 Claims. (Cl. 260—471)

This invention relates to new polyglycol esters and processes for their preparation. More particularly it concerns polyglycol esters of the formula

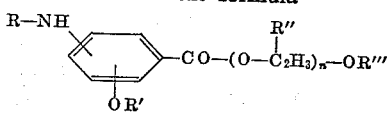

in which R and R' each represent an alkyl, cycloalkyl, alkoxyalkyl, or a saturated oxacycloalkyl-alkyl radical containing 1–7 carbon atoms such as methyl, ethyl, propyl, butyl, pentyl, hexyl, heptyl, cyclopentyl, cyclohexyl, methoxyethyl, ethoxyethyl, ethyloxybutyl and oxacyclohexylmethyl, and R may also represent hydrogen, R'' represents hydrogen or an alkyl or alkoxy-alkyl radical containing at most 4 carbon atoms, preferably a methyl, ethyl, methoxymethyl or ethoxymethyl group, R''' stands for hydrogen or a methyl or ethyl radical, and $n$ is a whole number from 7–17 indicating the number of similar or dissimilar radicals enclosed within brackets in the formula, provided that in at least $n/2$ radicals of the formula

R'' represents hydrogen.

The new esters exhibit valuable pharmacological properties. Thus, they possess a pronounced local anaesthetic action, and in particular they have a selective action on the dilatation receptors of the lung. They are useful as medicaments, advantageously as cough remedies.

Very valuable as anaesthetics, particularly cough remedies, are the esters of the above formula in which $n$ stands for a whole number from 7–11 and in which R preferably represents hydrogen or an alkyl radical containing 1–7 carbon atoms and R' an alkyl radical containing 1–7 carbon atoms, one of the radicals R and R' advantageously representing an alkyl radical containing at least 4 carbon atoms.

The new esters can be prepared as follows: a benzoic acid chloride of the formula

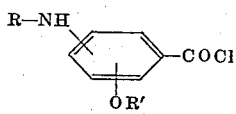

wherein R and R' have the meanings given above, is reacted with a polyglycol of the formula

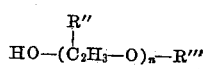

wherein R'', R''' and $n$ have the meanings given above.

Another method consists in treating an ester of a benzoic acid of the above given formula with an easily volatile alcohol, e. g. methanol, with the polyglycol of the above formula, preferably in the presence of a trans-esterification catalyst, such as an alkali methanolate, e. g. sodium methanolate.

The new esters with a primary or secondary amino group can advantageously also be prepared by carrying out the above processes with a chloride or ester of a benzoic acid of the formula

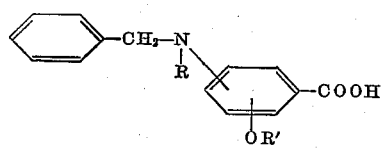

wherein R and R' have the meanings given above and R may also represent a benzyl radical and hydrogenatively splitting off the benzyl radicals of the polyglycol esters formed using debenzylating hydrogenation catalysts.

The isolation of the new compounds from the reaction mixtures is carried out by customary methods.

A specific embodiment of the invention consists for example in heating, 2-n-butoxy-4-n-butylamino-benzoic acid methyl ester with nona-ethylene glycol monomethyl ether in a solution of sodium methanolate in absolute methanol so as to bring about transesterification with formation of the ester of 2-n-butoxy-4-n-butylamino-benzoic acid with nona-ethylene glycol monomethyl ether. This embodiment is described in more detail in Example 2.

It is noteworthy that the new esters generally possess a considerable solubility in water. The solutions possess the peculiar property that when heated they become cloudy at a certain temperature dependent on the concentration. This temperature for a solution of 10 percent strength is referred to as the turbidity point and is a physical constant of the compound in question. The turbidity is reversible in that upon cooling the solution becomes clear.

Those compounds used as starting materials which are new can be made by customary methods.

The following examples illustrate the invention:

*Example 1*

2.23 grams of 2-n-butoxy-4-amino-benzoic acid methyl ester are heated, after the addition of 9.6 grams of nona-ethylene glycol nonomethyl ether and 0.15 cc. of a sodium methanolate solution of 30 percent strength in anhydrous methanol, for 3 hours with the exclusion of moisture under reduced pressure produced by a water jet pump in a bath having a temperature of 100–110° C. At the same time, 400 cc. of anhydrous xylene are run in at a uniform rate below the surface of the liquid and the vapour evolved is condensed in a descending condenser.

After being cooled, the reaction mixture is taken up in 100 cc. of benzene, and agitated twice in succession with 20 cc. of sodium carbonate solution of 10 percent strength and 20 cc. of water. The aqueous layers are washed twice with 100 cc. of benzene on each occasion. During the first extraction with the sodium carbonate solution insoluble constituents separate out, and the latter are filtered off and taken up in chloroform to yield 0.8 gram of a waxy colorless product that solidifies. The aqueous layers are united, and then extracted three times with 100 cc. of chloroform on each occasion. By evaporating the combined extracts there are obtained 4.75 grams of regenerated nona-ethylene glycol monomethyl ether.

From the combined dried benzene layers, there are obtained by evaporation under partially reduced pressure 5.8 grams of a brownish viscous oil, which consists mainly of a wax-like product and the 2-n-butoxy-4-amino-benzoic acid ester of nona-ethylene glycol monomethyl ether of the formula

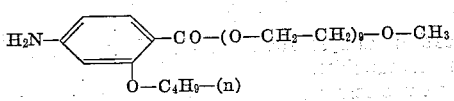

It may be purified, for example, by chromatography over neutral aluminum oxide with the use as solvents of carbon tetrachloride, benzene, methylene chloride and chloroform. There is obtained, in addition to a colorless waxy by-product that solidifies, the pure ester in the form of a colorless thickly liquid oil, which dissolves easily in water, and of which an aqueous solution of 10 percent strength produces a milky turbidity when heated above 49° C.

Example 2

2.8 grams of 2-n-butoxy-4-n-butylamino-benzoic acid methyl ester, after the addition of 8.6 grams of nona-ethylene glycol monomethyl ether and 0.15 cc. of a solution of 30 percent strength of sodium methanolate in absolute methanol, are heated with the exclusion of moisture for 3 hours under reduced pressure produced by a water jet jump in a bath having a temperature of 100–110° C. At the same time 400 cc. of anhydrous xylene are run in at a uniform rate below the surface of the liquid, and the vapour evolved is condensed in a descending condenser.

After being cooled, the reaction mixture is taken up in 100 cc. of benzene and agitated in succession twice with 20 cc. of an aqueous solution of 10 percent strength of sodium carbonate and 20 cc. of water. The aqueous layers are agitated twice in succession with 100 cc. of benzene on each occasion. During the first extraction with the sodium carbonate solution three layers are formed, of which the two lower layers are run into a second separating funnel, in which washing with benzene produces two layers. The aqueous layers, after being united, are extracted three times with 100 cc. of chloroform on each occasion, and in this manner 5.1 grams of nona-ethylene glycol monomethyl ether are obtained.

From the combined dried benzene layers there are obtained by evaporation under reduced pressure 6.5 grams of a brownish viscous oil, which, apart from a small amount of the ester starting material and impurities, consists mainly of the 2-(n)-butoxy-4-(n)-butylamino-benzoic ester of nona-ethylene glycol monomethyl ether of the formula

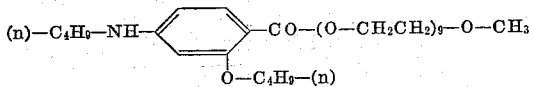

The crude product can be purified, for example by chromatography over neutral aluminum oxide with the use of solvents as carbon tetrachloride, benzene, methylene chloride and chloroform. There is obtained, in addition to a small amount of methyl ester and by-products, the pure ester in the form of a colorless thickly liquid oil, which dissolves easily in water and of which an aqueous solution of 10 percent strength produces a milky turbidity when heated above 39° C.

Example 3

10 cc. of thionyl chloride are added to 4.2 grams of ortho-(n)-hexoxy-para-dibenzylamino benzoic acid, dissolved in 40 cc. of benzene, in a flask fitted with stirring means with the exclusion of moisture and heated for 4 hours with gentle stirring in a bath at 90–100° C. The reaction mixture is evaporated with stirring and exclusion of moisture by gently heating under a water jet vacuum. The acid chloride is then dissolved 4 times in 25 cc. of anhydrous benzene each time to remove as completely as possible any excess thionyl chloride and then evaporated again as described above. The acid chloride is then dissolved in 30 cc. of anhydrous benzene and is then added dropwise in the course of 5 minutes with exclusion of moisture while stirring well to a solution of 15 grams of nonaethylene glycol-monomethyl ether in 15 cc. of anhydrous benzene to which 7.5 grams of anhydrous potassium carbonate have been added. Then the whole is stirred overnight.

50 cc. of benzene are then added and the mixture is extracted with 50 cc. of water. The benzene solution is washed neutral with an aqueous solution of sodium carbonate of 5% strength and water, whilst at the same time the aqueous layers formed are extracted again twice with 100 cc. of benzene each time. By evaporating the combined dried benzene extracts under reduced pressure there are obtained 7.3 grams of an almost colorless viscous oil which consists mainly of the ortho-(n)-hexoxy-paradibenzylamino-benzoic acid ester of nonaethyleneglycolmonomethyl ether of the formula

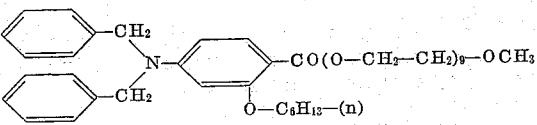

If this crude product is allowed to flow as a solution of 10% strength in ether through a column of 50 grams of aluminum oxide, the ester is obtained in pure form. The two benzyl groups can be removed by hydrogenation by being agitated in 50 cc. of glacial acetic acid with 2 grams of palladium carbon of 5% strength in an atmosphere of hydrogen.

For the purpose of purification the product filtered off from the catalyst, evaporated and dissolved in ether, is run through a column of 50 grams of aluminum oxide. On evaporation, the eluates leave behind the viscous colorless oil which consists of the ortho-(n)-hexoxy-para-amino benzoic acid ester of nonaethyleneglycol monomethyl ether of the formula

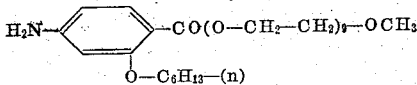

It is easily soluble in water and in many of the ordinary organic solvents, and an aqueous solution of 10% strength produces a milky turbidity when heated above 37° C.

The ortho-(n)-hexoxy-para-dibenzylamino benzoic acid used as starting material can be obtained by heating 11.3 grams of ortho-(n)-hexoxy-para-amino benzoic acid methyl ester of melting point 50–51° C., 12.7 grams of benzyl chloride, 8.2 grams of anhydrous sodium acetate and 110 mg. of iodine for 7 hours at 110–130° C. and hydrolyzing with an alkali. The pure acid is obtained by recrystallization from methanol and from cyclohexane in the form of colorless crystals which melt at 119–120° C.

Example 4

3.9 grams of meta-(n)-butoxy-para-dibenzylamino benzoic acid are converted into the acid chloride as described in Example 3. In the reaction with 17 grams of nona-ethylene-glycol-monomethyl ether 2 cc. of anhydrous pyridine are used instead of the potassium carbonate; otherwise the procedure is the same as described in the above example. On working up, the benzene extracts are first liberated from pyridine by treatment with aqueous hydrochloric acid of 5% strength.

By evaporating the combined dried benzene extracts under reduced pressure there are obtained 6.9 grams of a viscous oil which consists of the meta-(n)-butoxy-paradibenzylamino benzoic acid ester of nonaethylene glycol monomethyl ether of the formula

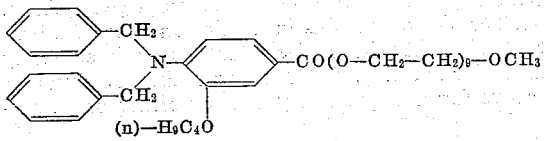

Purification and debenzylation are carried out as described in Example 3. There is obtained in good yield a colorless viscous oil which is the meta-(n)-butoxy-para-amino benzoic acid ester of nonaethylene glycol monomethyl ether of the formula

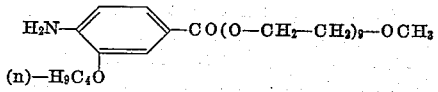

It is easily soluble in water and many of the ordinary organic solvents, and an aqueous solution of 10 percent strength produces a milky turbidity when heated above 43° C.

The meta-(n)-butoxy-para-dibenzylamino benzoic acid used as starting material can be prepared as follows:

The diethylamino ethyl ester of meta-(n)-butoxy-para-amino benzoic acid, which is obtainable in the trade in the form of the hydrochloride under the name Novesin, is converted by hydrolysis into the free acid. 14.6 grams thereof are dissolved in 100 cc. of methanol and 40 cc. of concentrated sulfuric acid are added dropwise with cooling and stirring. After heating to 60–65° C. for 4 hours, the cooled reaction mixture is poured on to a mixture of 500 grams of ice, 100 cc. of water and 70 cc. of ammonia of 25% strength and the pH value adjusted to 7 with acetic acid. The resulting precipitate is filtered with suction, washed neutral and dried. The methyl ester is obtained after recrystallization from methanol in the form of colorless crystals which melt at 74–75° C. For further purification the mixture can be taken up in 70 cc. of benzene and filtered over 10 grams of aluminum oxide. After evaporation, the benzene residue is recrystallized from benzine, whereupon 12 grams of pure methyl ester of melting point 76–77° C. are obtained. 11.2 grams of the latter are dibenzylated with 14 grams of benzyl chloride, 9 grams of anhydrous sodium acetate and 110 mg. of iodine in an analogous manner to that described in Example 3, and hydrolyzed. From the crude product there is obtain after several recrystallizations from methanol and ethanol alternately the pure meta-(n)-butoxy-para-dibenzylamino benzoic acid in the form of colorless, thick prisms melting at 155–157° C.

*Example 5*

3.35 grams of ortho-(n)-butoxy-ethoxy-para-cyclopentylamino benzoic acid methyl ester and 12.9 grams of nonaethylene glycol monomethyl ether are carefully dried. 0.2 cc. of 4 N-sodium methylate solution in methanol are then added and the mixture is heated while running in xylene as described in Example 1. After an hour at 125–135° C. internal temperature the transesterification is finished. A test portion is clearly soluble in cold water. For working up, the mixture is taken up in 150 cc. of benzene and extracted in succession with 130 cc. of sodium hydrogen carbonate solution of 3% strength, 50 cc. of 2 N-sodium carbonate solution, and then twice with 100 cc. of sodium chloride solution of 5% strength each time. All the aqueous layers are washed once with the same 50 cc. of benzene. The combined benzene solutions dried with sodium sulfate are evaporated, 6.8 grams of the new ester of the formula

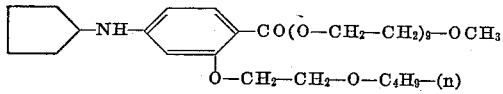

being obtained in the form of a pale brownish oil. For the purpose of purification the product can be dissolved in 50 cc. of ether and filtered over 30 grams of aluminum oxide which is washed with 300 cc. of ether. By evaporating the ether there are obtained 6.2 grams of a colorless oil soluble in acetone, methanol and chloroform. An aqueous solution of 10% strength has a turbidity point of 35° C.

On alkaline hydrolysis of the new ester there is obtained after the usual working up a carboxylic acid in almost theoretical yield which, after being recrystalized once from benzene and benzine, melts at 69–70° C. The mixed melting point with authentic ortho-(n)-butoxy-ethoxy-para-cyclopentyl-amino benzoic acid shows no depression.

The methyl ester of the above carboxylic acid used as starting material for the new ester can be prepared as follows:

45.2 grams of butoxy-ethyl benzene sulfonate, 46 grams of the potassium salt of ortho-hydroxy-para-acetylamino benzoic acid methyl ester and 2 grams of potassium carbonate are boiled under reflux and with the exclusion of moisture in 300 cc. of absolute isopropanol for about 10 hours. Any undissolved portions are then filtered off, and the filtrate is evaporated under reduced pressure. For the purpose of hydrolysis, the residue is boiled with 200 cc. of ethanol, 100 cc. of water, and 70 cc. of 10 N-sodium hydroxide solution for about 6 hours under reflux. The mixture is concentrated to about ⅓ under reduced pressure and acidified with glacial acetic acid. The amorphous precipitate is extracted with ethyl acetate and washed with sodium chloride solution of 10% strength. The ethyl acetate solution dried with sodium sulfate is evaporated under reduced pressure. From the residue there are obtained by recrystallization from a mixture of ethyl acetate and benzine (2:1) crystals melting at 93–95° C. The product can be further purified by recrystallization with benzene or methanol of 80% or 100 percent strength. The so obtained analytically pure ortho-butoxy-ethoxy-para-amino-benzoic acid melts at 95–96° C. For conversion into the methyl ester 15.2 grams of the product are stirred with 100 cc. of methanol and 40 cc. of concentrated sulfuric acid are added dropwise with cooling. The whole is then boiled under reflux on the water bath for two to four hours. The cooled mixture is introduced into a mixture of 500 grams of ice, 70 cc. of ammonia of 25% strength and 100 cc. of water with stirring. The pH value is adjusted to about 6 with glacial acetic acid. The crystalline precipitate is filtered with suction and washed with water. After recrystallization from a little methanol, while cooling to —15° C., there is obtained the new methyl ester melting at 92–93° C. For the purpose of introducing the cyclopentyl residue into the amino group, 24.4 grams of the ester, 12.6 grams of cyclopentanone, 250 mg. of platinum oxide, 25 cc. of 2 N-hydrochloric acid are hydrogenated in 250 cc. of methanol. After 6–8 hours the mixture is filtered off from the catalyst and the hydrochloric acid is neutralized with 10 grams of sodium hydrogen carbonate. The precipitated salts are filtered off and the solution is evaporated under reduced pressure. The residue is taken up in ether and washed with sodium hydrogen carbonate solution, whereupon there is obtained by evaporation 29.4 grams of a pale greenish-yellow oil which is distilled in high vacuum; boiling point 162–164° C. under 0.008 mm. pressure of mercury. By alkaline hydrolysis there is obtained the above mentioned carboxylic acid melting at 69–70° C.

*Example 6*

1.68 grams of ortho-(n)-butoxy-ethoxy-para-cyclopentylamino benzoic acid methyl ester are transesterified with 7.75 grams of undeca-ethyleneglycol-monomethyl ether in the manner described in the preceding example. After working up and filtering an ethereal solution over aluminum oxide there are obtained 3.2 parts of the new ester of the formula

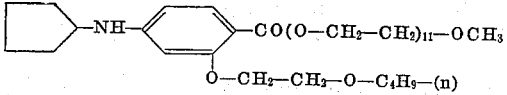

in the form of a faintly yellow oil which is soluble in acetone, chloroform and ethyl acetate; an aqueous solution of 10% strength has a turbidity point of 47° C.

The undeca-ethyleneglycol monomethyl ether is obtained as follows:

64.3 grams of nonaethyleneglycol monomethyl ether of melting point 13–14° C. are converted into the benzene sulfonic acid ester. 65 grams of this oily ester are added dropwise at 100–110° C. to a mixture obtained by dissolving 2.8 grams of sodium in 60 cc. of diethylene glycol. The mixture is allowed to stand overnight at 100–110° C. under nitrogen. The reaction mixture is dissolved in water and extracted with benzene. The aqueous solution is extracted with chloroform and the chloroform solution is washed several times with a sodium chloride solution of 1% strength. After drying with potassium carbonate and evaporation there are obtained 54.4 grams of a pale yellow oil. This crude product is heated with 50 cc. of ammonia of 25% strength on a steam bath for 16 hours. After distilling off the ammonia solution and drying on the steam bath under reduced pressure, the oily residue is taken up in 150 cc. of water and filtered through a column which is filled with a mixture of 50 cc. each of an activated acid and basic exchange resin. After elutriation with 500 cc. of water, the combined filtrates are evaporated in vacuo and dried at 100° C. There are obtained 51 grams of a practically colorless oil. On distillation in high vacuum under about 0.01 mm. of mercury, 43 grams of pure undeca-ethyleneglycol-monomethyl ether passing over at 236–238° C. are obtained. The latter solidifies on deep-cooling to a crystalline, snow-white, very hygroscopic mass which melts at 22° C. with the exclusion of moisture.

*Example 7*

1.40 grams of ortho-methoxy-para-tetrahydro-pyranyl-(2)-methylamino benzoic acid methyl ester are transesterified with 8.6 grams of nonaethyleneglycol monomethyl ether in the presence of catalytic quantities of sodium methylate according to the method described in Example 5. After distributing the reaction mixture between benzene and the aqueous solution mentioned in Example 5, 2.8 grams of the new ester of the formula

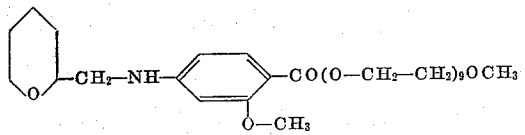

are obtained in the form of a yellowish oil. For the purpose of purification the product can be taken up in ether and filtered through a column of aluminum oxide.

From the ethereal solution there are obtained on evaporation 2.3 grams of the new compound in the form of a very faintly yellowish oil which, with the exception of aliphatic hydrocarbons, is readily soluble in nearly all organic solvents. The turbidity point of an aqueous solution of 10% strength is at 62° C.

The ortho - methoxy - para - tetrahydropyranyl-(2)-methylamino-benzoic acid methyl ester used as starting material can be obtained as follows:

11.5 grams of ortho-methoxy-para-aminobenzoic acid methyl ester, 40 cc. of 2-tetrahydropyranyl carbinol and 6 grams of Raney nickel are stirred for 20 hours at 150–160° C. Any insoluble portions are filtered off and the filtrate is washed with warm methanol. From the combined filtrates there are obtained on evaporation under reduced pressure 12 grams of a residue which is washed in ether with 1 N-hydrochloric acid and saturated sodium bicarbonate solution. The 4.4 grams of ether residue are then hydrolyzed in an alkaline medium directly to the free carboxylic acid. After crystallization from ethyl acetate and petroleum ether (1:1) and from methanol of 90% strength there are obtained 2.4 grams of ortho - methoxy - para-tetrahydropyranyl-(2)-methyl - amino benzoic acid melting at 102–103° C. The methyl ester is obtained with diazomethane. It melts at 108° C.

*Example 8*

3.9 grams of meta-(n)-butoxy-para-dibenzylamino-benzoic acid are converted into the acid chloride according to the procedure described in Example 3. The acid chloride, after being dissolved in 30 cc. of dry benzene is reacted as described in Example 3, with 17.5 grams of heptaethyleneglycol in 35 cc. of anhydrous benzene in the presence of 2 cc. of pyridine. On working up in an analogous manner there are obtained 6.2 grams of a slightly discolored, viscous oil which is the meta-(n)-butoxy-para-dibenzylamino benzoic acid monoester of heptaethylene glycol of the formula

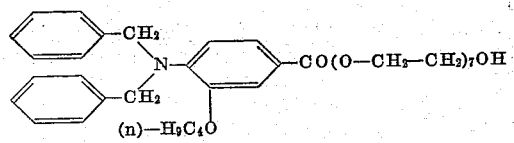

For the purpose of purification this crude product in ether is allowed to run through a column of 200 grams of aluminum oxide, extremely small quantities of impurities being eluated. Further portions of by-products can be eluated with methylene chloride whilst the monoester is obtained by elution with an increasing chloroform content of the methylene chloride.

Hydrogenating debenzylation of the monoester in the way described in the above-mentioned example yields the meta-(n)-butoxy-para-amino benzoic acid monoester of heptaethylene glycol of the formula.

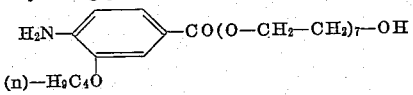

It is readily soluble in water and some of the most usual organic solvents and an aqueous solution of 10% strength produces a milky turbidity when heated above 42° C.

*Example 9*

2.8 grams of ortho-(n)-butoxy-para-(n)-butylamino benzoic acid methyl ester are transesterified with 18 grams of purified technical polyethylene-glycol-monomethyl ether of an average molecular weight of 750 in the presence of catalytic quantities of sodium methylate according to the method described in Example 5. By distribution between benzene and saturated sodium hydrogen carbonate solution the reaction mixture is purified, whereupon 9.8 grams of the new ester mixture of the formula

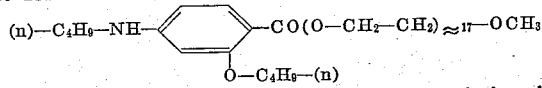

are obtained by evaporating the benzene solution in the form of a nearly colorless viscous oil which is soluble in water at body temperature of a warm-blooded animal. The designation ≈17 means that the new ester mixture contains on an average about 17 members per polyethyleneglycol chain.

The purification of the polyethylene-glycol used as starting material is described in U. S. Patent No. 2,714,608, Example 8.

*Example 10*

4.2 grams of ortho-(n)-hexoxy-para-dibenzylamino-benzoic acid are converted into the chloride as described in Example 3, esterified with 20 grams of hepta-ethyleneglycol-ω,ω'-di-[2-hydroxy-n-propyl-ether-(1)] and worked up. After removing the two benzyl residues by catalytic hydrogenolysis and chromatography as described in Example 8 (for the removal of di-ester) there is obtained the new ester of the formula

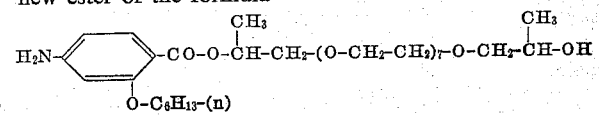

in the form of a yellowish oil which is soluble in water at body temperature of a warm-blooded animal.

The hepta-ethylene glycol-$\omega,\omega'$-di-[2-hydroxy-n-propyl-ether-(1)] used as starting material can be obtained in the following way:

280 cc. of triethylene-glycol dissolved in 2000 cc. of benzene, are mixed while stirring well and cooling from time to time uniformly with 800 cc. of benzene sulfochloride and 400 grams of pulverized sodium hydroxide at 30–35° C. in the course of 2½ hours. The whole is stirred for another 24 hours and then allowed to stand for 2 days. By stirring in 2500 cc. of water, the reaction mixture is dissolved completely in 2 layers. The two layers are separated and the aqueous layer is extracted by agitation with 400 cc. of benzene. The combined benzene solutions are agitated for 4 hours on the machine after being mixed with 200 cc. of aqueous ammonia of 25% strength. 200 cc. of 2 N-caustic soda solution are then added and the whole is agitated for a short time. The aqueous layer is then separated and extracted by agitation with 400 cc. of benzene. The two benzene layers are washed in succession by agitation with 200 cc. of 2 N-caustic soda solution and 200 cc. of water. From the combined benzene solutions dried with sodium sulfate there are obtained by evaporating the benzene under partially reduced pressure 820 grams of crude dibenzenesulfonic acid ester of triethylene-glycol which is recrystallized from 10,000 cc. of methyl alcohol. By slowly cooling to —17° C. there are obtained 690 parts by weight of crystalline diester melting at 38–39° C.

215 grams of the latter are liquefied by mixing with a little ether, and in the course of 4 hours at 110° C. bath temperature while stirring well and with the exclusion of moisture the mixture is added dropwise to 350 cc. of 2.85 N-sodium diethylene glycolate solution in diethylene glycol. The whole is heated for 24 hours at 100–110° C.

The cooled reaction mixture is extracted exhaustively with ether. There are obtained 442 grams of an oily, nearly colorless extract and 200 grams of crystalline sodium benzene sulfonate. The extract, after being mixed with 100 cc. of aqueous ammonia of 25% strength, is allowed to stand overnight and then slowly heated to 100° C. The mixture is heated for 2 hours at 100° C. and then completely evaporated at the water jet vacuum. There remain 442 grams of an almost colorless oil which is allowed to run through a wet column of an exchanger mixed-bed of 100 cc. each of Amberlite JR–120 and JRA–410. The mixture is eluated exhaustively with water and there are obtained by evaporating the water at the water jet vacuum 436 grams of only slightly discolored oil from which 303 grams of triethylene-glycol are distilled off in high vacuum, and at 157° C. under 0.008 mm. pressure of mercury 104 grams of hepta-ethylene-glycol. Finally, at 225° C. under 0.03 mm. pressure of mercury 16 grams of dodecaethylene-glycol are separated as main higher boiling by-product from 3 grams of distillation residue.

32.7 grams of heptaethylene-glycol are dissolved in 100 cc. of benzene. In the course of half an hour while stirring briskly and cooling from time to time 40 cc. of benzene sulfo-chloride and 20 grams of pulverized sodium hydroxide are added uniformly and at 25–30° C. The whole is stirred for 3 hours longer and the temperature is allowed to rise to 40° C. at the most by removing the cooling.

After allowing the reaction mass to stand overnight, the salts are dissolved by stirring in 120 cc. of water and the two layers separated. The aqueous layer is extracted with 20 cc. of benzene. The combined benzene solutions are mixed with 10 cc. of ammonia of 25% strength and agitated on the machine for 4 hours. 10 cc. of 2 N-caustic soda solution are then added and the mixture is agitated again for a short time. The aqueous layer is separated and extracted with 20 cc. of benzene. The two benzene layers are washed consecutively by agitation with 10 cc. of 2 N-caustic soda solution and three times with 10 cc. of water each time. From the combined benzene solutions dried with sodium sulfate there are obtained by evaporating the benzene under partially reduced pressure 58 grams of oily, slightly yellowish di-benzene sulfonic acid ester of hepta-ethylene-glycol.

56.7 grams of this diester in 100 cc. of absolute benzene are added dropwise in the course of 1 hour at 80° C. bath temperature while stirring and with the exclusion of moisture to 70 cc. of 2.85 N-sodium-1,2-propylene glycolate solution in 1,2-propylene glycol. The mixture is heated for 20 hours while stirring gently at 80° C.

After allowing the reaction mass to cool, the precipitated sodium benzene sulfonate is dissolved by stirring in 75 cc. of water and the aqueous layer is separated. The latter is extracted by agitation three times with 250 cc. of chloroform each time. On evaporating the combined, dried chloroform solutions, 48.2 grams of crude product are obtained which, after being mixed with 50 cc. of aqueous ammonia of 25% strength, is allowed to stand for two days and is then slowly heated to 80° C. The water and the ammonia are removed by suction at the water jet vacuum and the residue is allowed to run through a moist column of a mixed bed of 25 cc. of Amberlite JR–120 and 50 cc. of Amberlite JRA–410. The column is washed exhaustively with water and by evaporating the eluates there are obtained 44 grams of a brownish oil which is distilled in high vacuum to give 32 grams of hepta-ethyleneglycol-$\omega,\omega'$-[2-hydroxy-n-propyl ether-(1)] in the form of a colorless oil boiling at 182° C. under 0.01 mm. of pressure.

*Example 11*

110 grams of commercial, dry polyethylene-glycol-monomethyl ether of an average molecular weight 550 are heated with 0.2 gram of potassium hydroxide in an autoclave fitted with stirring means at 170–180° C. in an atmosphere of nitrogen. 52 grams of 1,2-propylene oxide are slowly pressed in with nitrogen. The condensation is complete after a short time, which can be seen by the reduction in pressure induced by the consumption of propylene oxide. For the purpose of purification, the brown contents of the autoclave, which weigh 161.6 grams after being heated for half an hour at 100° C. under 10 mm. pressure of mercury, are dissolved in 750 cc. of water and agitated for 3 hours with 8 grams of active charcoal. The reaction mass is filtered, the residue is washed with 120 cc. of water and the filtrates are mixed with 100 grams of sodium chloride. By exhaustive extraction with chloroform there are obtained after evaporating and drying at 100° C. in vacuo, 157 grams of a pale yellow oil the molecular weight of which is 810 on the basis of determination of the number of hydroxyl groups. The polyether alcohol so obtained is a mixture of various polymerization steps of the formula

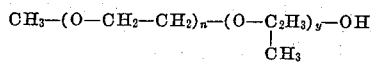

wherein $n$ has an average value of 12, and $n+y=16$.

19 grams of this product are esterified with 4 grams of meta-(n)-butoxy-para-dibenzyl-amino-benzoyl chloride (cf. Example 4) according to the method described in Example 3, and worked up. After splitting off the two benzyl residues by hydrogenolysis in the presence of palladium carbon the new ester mixture of the formula

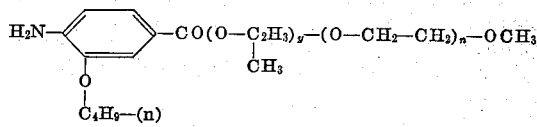

is obtained in the form of a practically colorless, viscous oil soluble in water at room temperature. In the above formula $n$ has an average value of about 12 and $n+y$ an average value of about 15.

Example 12

4.45 grams of 3-(n)-heptoxy-5-dibenzylamino benzoic acid methyl ester are transesterified with 11 grams of octa-ethylene glycol-ω-methyl ether-ω'-(2-hydroxy-3-ethoxy-propl ether) in the presence of catalytic quantities of potassium methylate according to the method described in Example 5. After distribution between benzene and saturated sodium hydrogen carbonate solution and evaporation of the benzene layers, there is obtained a polyether ester which on hydrogenation with palladium carbon at room temperature in glacial acetic acid gives the new ester of the formula

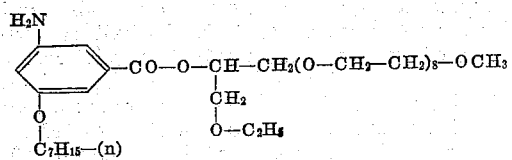

which is soluble in water at room temperature and is a practically colorless oil.

The methyl ester used above as intermediate product can be obtained in the following way:

12 grams of 3-(n)-heptoxy-5-nitro-benzoic acid (cf. Journal of the American Chemical Society 77, 4061 [1955]), are dissolved in 100 cc. of ether and slowly mixed with an equivalent quantity of ethereal diazomethane solution. When the evolution of nitrogen has subsided, the reaction mass is allowed to stand for half an hour at room temperature. After evaporating the ether 13.1 grams of residue are obtained which can be crystallized from methanol with cooling to −15° C. The so prepared 3-(n)-heptoxy-5-nitro-benzoic acid methyl ester melts at 25° C. 11.7 grams of the latter are hydrogenated in the presence of palladium carbon in methanol-glacial acetic acid 1:1 at room temperature and atmospheric pressure until the calculated quantity of hydrogen has been taken up. After removing the catalyst by filtration the mixture is evaporated under reduced pressure. The residue is taken up in ether and this solution is washed with 2 N-sodium carbonate solution and water. The ether solution dried over sodium sulfate leaves on evaporation a residue behind which, after recrystallization from methanol of 80% strength melts at 67° C. For further purification the mixture can be dissolved in benzene and filtered over a little aluminum oxide. After distilling off the benzene, the product is recrystallized once more from cyclohexane, whereupon 3-(n)-heptoxy-5-amino benzoic acid methyl ester melting at 68–69° C. is obtained in the form of colorless, flat prisms. Yield, 8.4 grams. The N-dibenzyl compound of this ester is obtained according to the method described in Example 3, the crude dibenzyl derivative is first hydrolysed to the free carboxylic acid which, on recrystallization from methanol and benzine, melts at 99–100° C. The methyl ester is obtained from the latter by reaction with diazomethane in ethereal solution. It melts at 46–47° C.

Example 13

3.5 grams of 3-(n)-heptoxy-5-dibenzylamino-benzoic acid methyl ester (cf. Example 12) are transesterified for 2 hours with 8 grams of deca-ethylene-glycol monomethyl ether in the presence of 0.2 cc. of absolute methanolic sodium methylate solution of 25% strength according to the data given in Example 2. On working up in an analogous manner, there are obtained 7 grams of a viscous, nearly colorless oil which is the 3-(n)-heptoxy-5-dibenzylamino-benzoic acid ester of deca-ethylene glycol mono-methyl ether of the formula

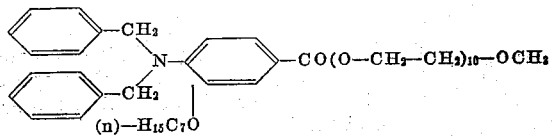

Its purification and debenzylation can be carried out in an analogous manner to that described in Example 3. The crude product so obtained is run in ether through a column of 50 grams of aluminum oxide. On evaporation, the eluates leave behind a viscous, colorless oil which consists of the 3-(n)-heptoxy-5-amino-benzoic acid ester of deca-ethylene glycol monomethyl ether of the formula

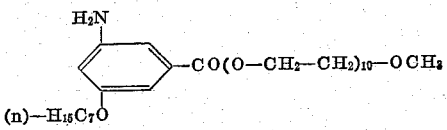

It is readily soluble in water and many of the ordinary organic solvents and is precipitated at a milky turbidity from an aqueous solution of 10% strength when heated at a temperature above 54° C.

The deca-ethylene-glycol-monomethyl ether used in this example can be obtained in the same way as the undeca-ethylene glycol monomethyl ether described in Example 6 from the benzene sulfonic acid ester of nona-ethylene-glycol-mono-methyl ether with ethylene glycol. After working up in the manner described in Example 6, there are obtained 56 grams of the new polyether boiling at 218–220° C. under about 0.01 mm. pressure of mercury in the form of a colorless oil which, on deep-cooling, solidifies to a snow-white hygroscopic mass which melts at 18–18.5° C. with the exclusion of moisture.

If the 3-(n)-heptoxy-5-dibenzylamino benzoic acid methyl ester is transesterified with octaethylene-glycol-mono-methyl ether instead of the above used deca-ethylene glycol-monomethyl ether, there is obtained the 3-(n)-heptoxy-5-amino-benzoic acid ester of octa ethylene-glycol mono-methyl ether.

What is claimed is:

1. Esters of the formula

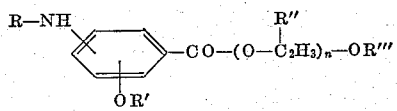

wherein R represents a member selected from the group consisting of alkyl, cycloalkyl, alkoxyalkyl, tetrahydropyranyl-alkyl radicals containing 1–7 carbon atoms and hydrogen, R' stands for a member selected from the group consisting of alkyl, cycloalkyl, alkoxyalkyl, and tetrahydropyranyl-alkyl radicals containing 1–7 carbon atoms, R'' represents a member selected from the group consisting of hydrogen, alkyl and alkoxyalkyl radicals containing at most 4 carbon atoms, R''' stands for a member selected from the group consisting of hydrogen, methyl and ethyl radicals and $n$ is a whole number from 7–17 indicating the number of radicals enclosed within brackets in the formula, provided that in at least $n/2$ radicals of the formula

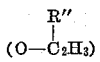

R'' represents hydrogen.

2. Esters of the formula

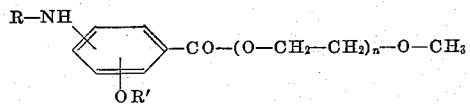

wherein R and R' represent alkyl radicals containing 1–7 carbon atoms and $n$ stands for a whole number from 7 to 11.

3. Esters of the formula

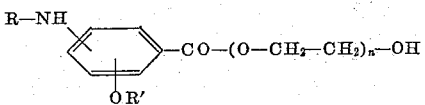

wherein R and R' represent alkyl radicals containing 1-7 carbon atoms and $n$ stands for a whole number from 7 to 11.

4. Esters of the formula

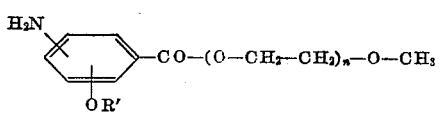

wherein R' stands for an alkyl radical containing 1-7 carbon atoms and $n$ represents a whole number from 7 to 11.

5. Esters of the formula

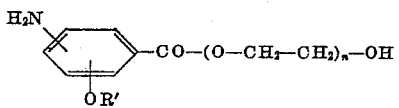

wherein R' stands for an alkyl radical containing 1-7 carbon atoms and $n$ represents a whole number from 7 to 11.

6. The ester of the formula

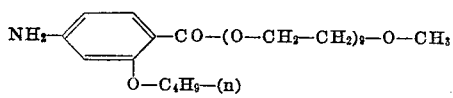

7. The ester of the formula

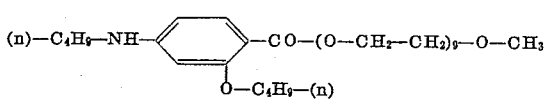

8. The ester of the formula

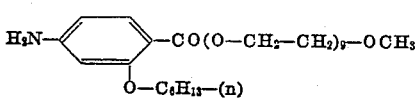

9. The ester of the formula

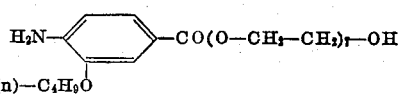

10. The ester of the formula

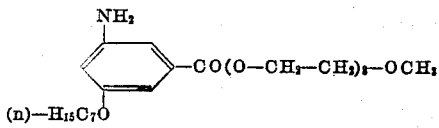

References Cited in the file of this patent
UNITED STATES PATENTS

| | | |
|---|---|---|
| 1,889,645 | Eisleb | Nov. 29, 1932 |
| 2,073,100 | Eisleb | Mar. 9, 1937 |
| 2,423,025 | Holmes et al. | June 24, 1947 |
| 2,657,209 | Clinton et al. | Oct. 27, 1953 |
| 2,689,248 | Clinton et al. | Sept. 14, 1954 |
| 2,691,025 | Clinton et al. | Oct. 5, 1954 |
| 2,714,607 | Matter | Aug. 2, 1955 |
| 2,714,608 | Matter | Aug. 2, 1955 |
| 2,714,609 | Matter | Aug. 2, 1955 |
| 2,714,610 | Matter | Aug. 2, 1955 |
| 2,727,040 | Clinton et al. | Dec. 13, 1955 |
| 2,794,825 | Matter | June 4, 1957 |

FOREIGN PATENTS

| | | |
|---|---|---|
| 728,583 | Great Britain | Apr. 20, 1955 |